United States Patent [19]
Lo Presti et al.

[11] Patent Number: 5,409,755

[45] Date of Patent: Apr. 25, 1995

[54] BULKHEAD VOID FILLER

[75] Inventors: Philip B. Lo Presti, Chicago; Edward T. Feldman, Buffalo Grove, both of Ill.

[73] Assignee: Shippers Paper Products Company, Glenview, Ill.

[21] Appl. No.: 176,899

[22] Filed: Jan. 3, 1994

[51] Int. Cl.[6] .......................... B32B 3/04; B32B 3/06
[52] U.S. Cl. ...................... 428/57; 428/100; 428/101; 428/183; 428/184; 428/185; 428/186; 410/154; 410/156
[58] Field of Search ................. 428/57, 101, 184, 223, 428/185, 186, 183, 100; 410/154, 156

[56] References Cited

U.S. PATENT DOCUMENTS

| | | | |
|---|---|---|---|
| 1,987,798 | 1/1935 | Ruppricht | 428/183 |
| 5,132,156 | 7/1992 | Trassare et al. | 428/116 |

FOREIGN PATENT DOCUMENTS 581381 10/1946 United Kingdom .................. 428/57

*Primary Examiner*—Alexander S. Thomas
*Attorney, Agent, or Firm*—Schwartz & Weinrieb

[57] ABSTRACT

An inverted V-shaped bulkhead void filler for filling empty spaces in a cargo area during shipping includes a novel non-pivotable, but disengagable, interlocking structure. The bulkhead void filler includes first and second rigid panels of a sandwich-type construction attached by the interlocking structure at an upper end of each of the panels. To form the novel non-pivotable, but disengagable, interlocking structure, the second panel includes a side clip and end clips attached to its upper end. The clips define a gap substantially equal to the width or thickness of a leg of the core. The leg of the core of the first panel is slid into the gap and held securely therein.

22 Claims, 3 Drawing Sheets

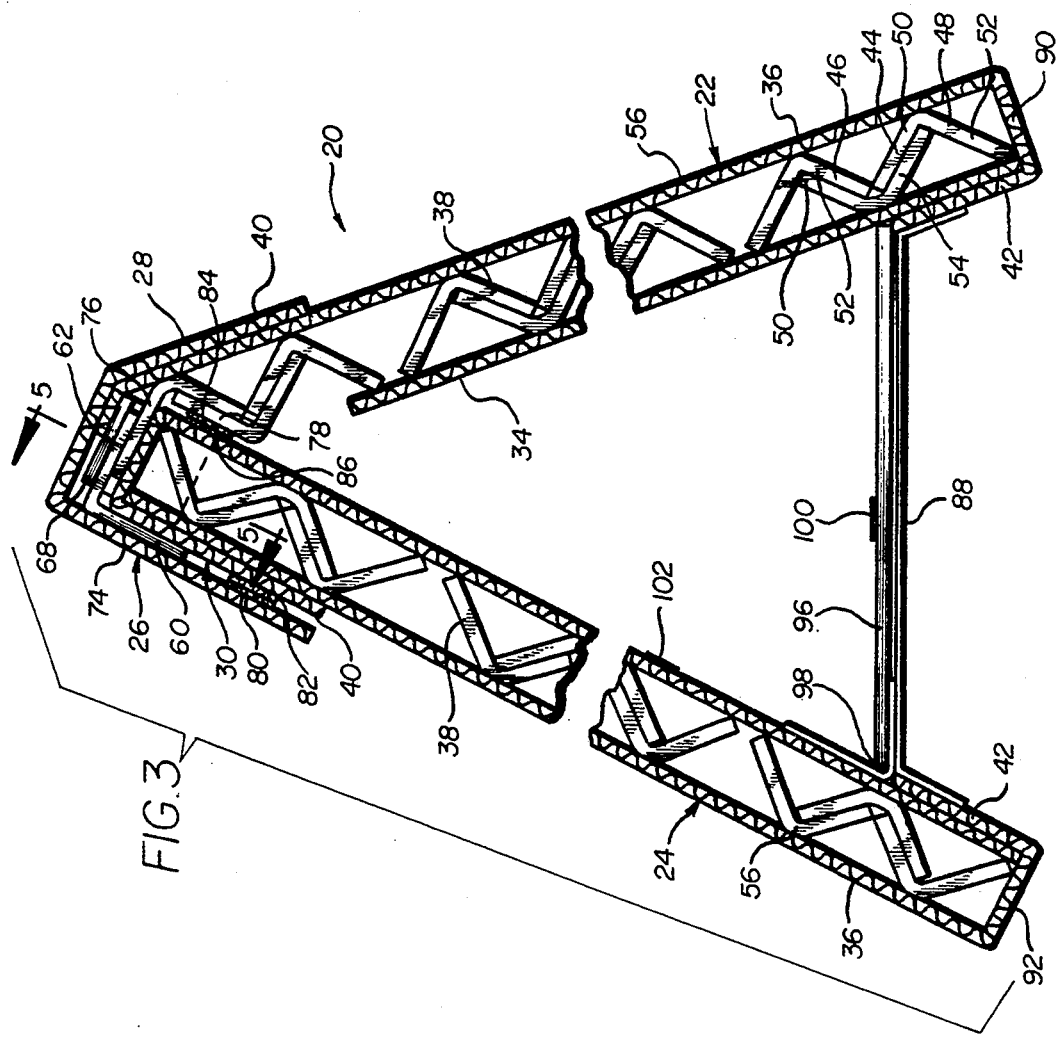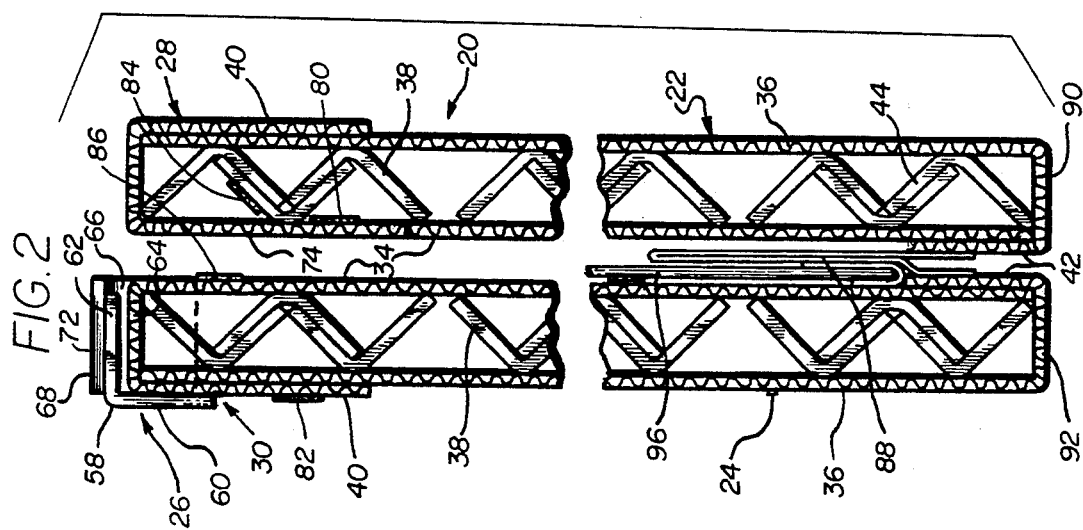

BULKHEAD VOID FILLER

FIELD OF THE INVENTION

This invention is generally directed to a light-weight bulkhead void filler for filling empty spaces in a cargo area to prevent cargo from shifting during transport. More particularly, the invention contemplates an inverted V-shaped void filler that, when assembled, is non-pivotable.

BACKGROUND OF THE INVENTION

The use of light-weight bulkhead void fillers is well-known in the art. For example, U.S. Pat. No. 5,132,156 presents an inverted V-shaped, light weight void filler that is comprised of two panels connected at their upper ends by a pivotable connection. The panels may be moved from a closed, side-by-side position to an open inverted V position by moving the bottom ends of the panels outwardly. The void filler relies on a limiter to prevent the panels from spreading too great of a distance and collapsing outwardly.

Under certain conditions, however, this type of void filler can collapse. For example, if the load generated by the cargo during shipment is not distributed in a uniform manner on this prior art void filler, it has the tendency to collapse by pivoting to the closed, side-by-side configuration.

The present invention is intended to overcome or minimize problems associated with prior art void fillers, as well as to present several other improvements.

OBJECTS OF THE INVENTION

A general object of the present invention is to provide a non-pivotable bulkhead void filler for use in cargo areas during shipping.

Another object of the present invention is to provide a bulkhead void filler having a novel construction with two rigid panels and all interlocking structure.

It is a further object of the present invention to provide a bulkhead void filler that has a non-pivotable, but disengagable, interlocking structure between two rigid panels which forms an inverted V-shaped bulkhead void filler.

It is a specific object of the present invention to provide a bulkhead void filler that is rigid and strong.

SUMMARY OF THE INVENTION

Briefly, and in accordance with the foregoing, the present invention discloses an inverted V-shaped bulkhead void filler having a novel non-pivotable, but disengagable, interlocking structure for filling empty spaces in a cargo area during shipping. The bulkhead void filler has first and second rigid panels of a sandwich-type construction including a core and attached by the interlocking structure at an upper end of each of the panels. To form the novel non-pivotable, but disengagable, interlocking structure, the second panel includes a side clip and end clips attached to its upper end. The clips form a gap substantially equal to the width or thickness of a panel of the core. A panel of the core of the first panel fits into the gap and is held securely therein.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements throughout the several views, and in which:

FIG. 2 is a cross-sectional view of the bulkhead void filler, partially cut away, in a disassembled condition according to the present invention;

FIG. 3 is a cross-sectional view of the bulkhead void filler, partially cut away, in the assembled condition;

DETAILED DESCRIPTION OF THE PREFERRED EMBODIMENT

Figure 1:
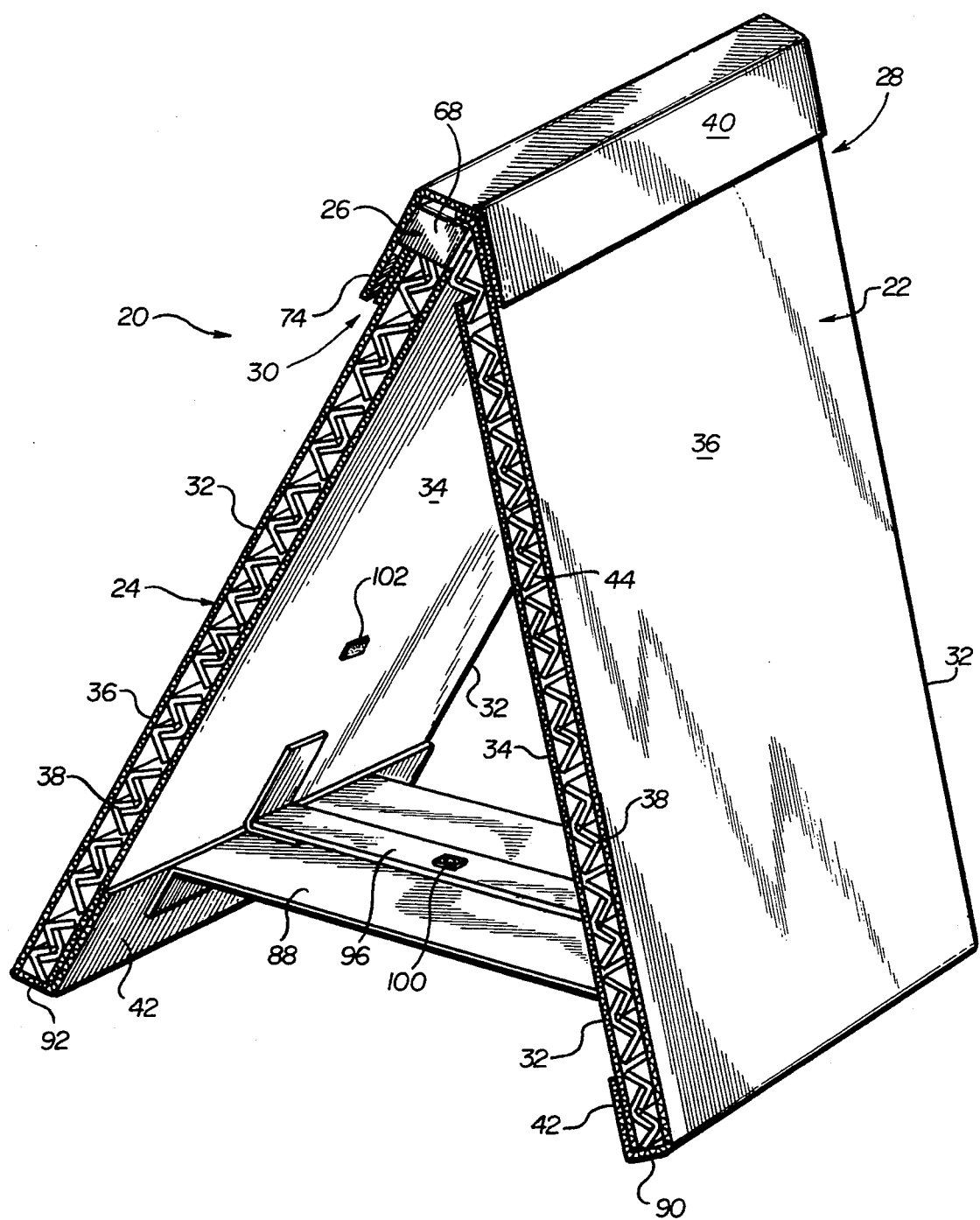
FIG. 1 is a perspective view of a bulkhead void filler according to the present invention.
Figure 4:
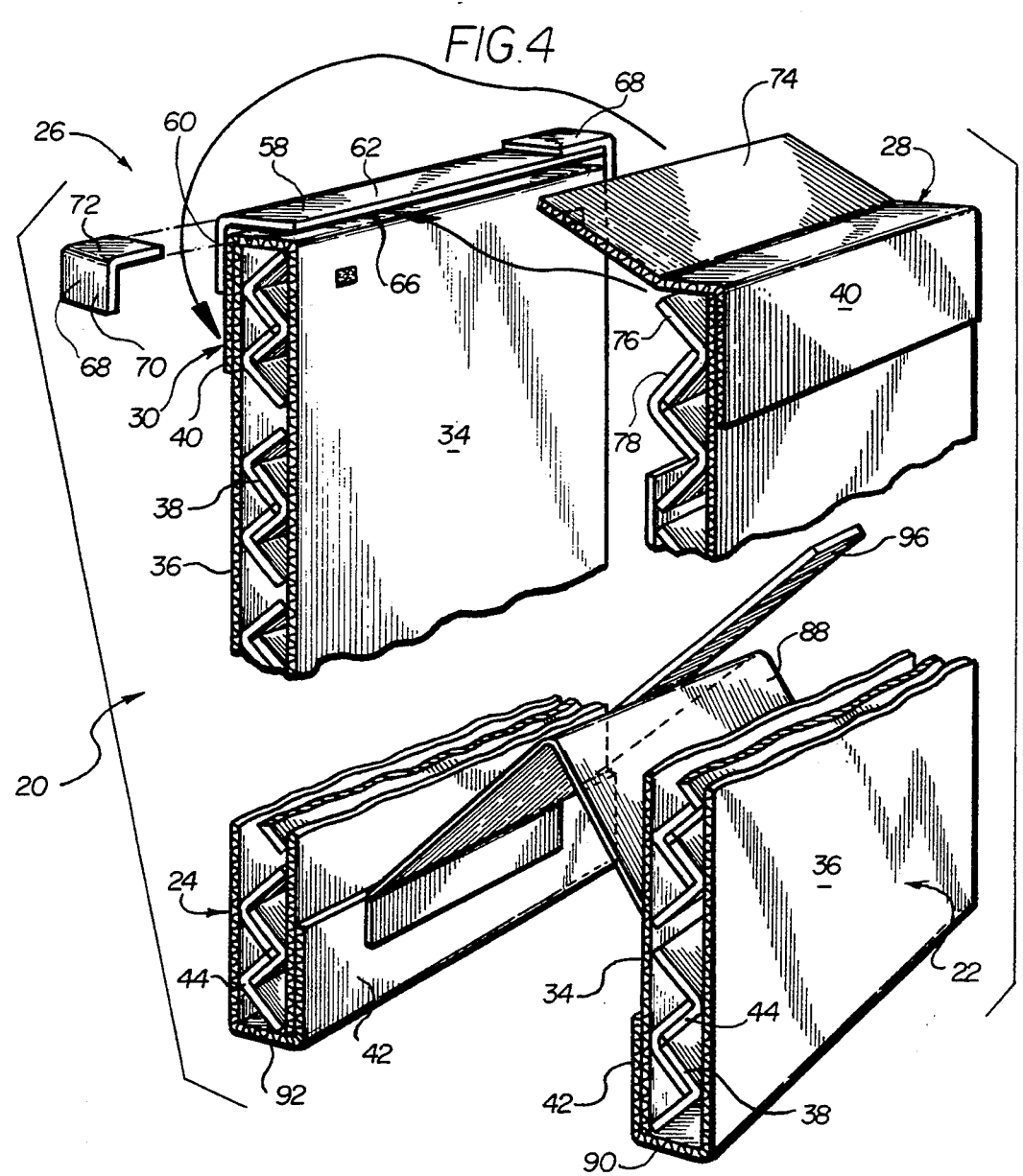
FIG. 4 is a perspective view of the bulkhead void filler, partially cut away, in a disassembled condition.
Figure 5:
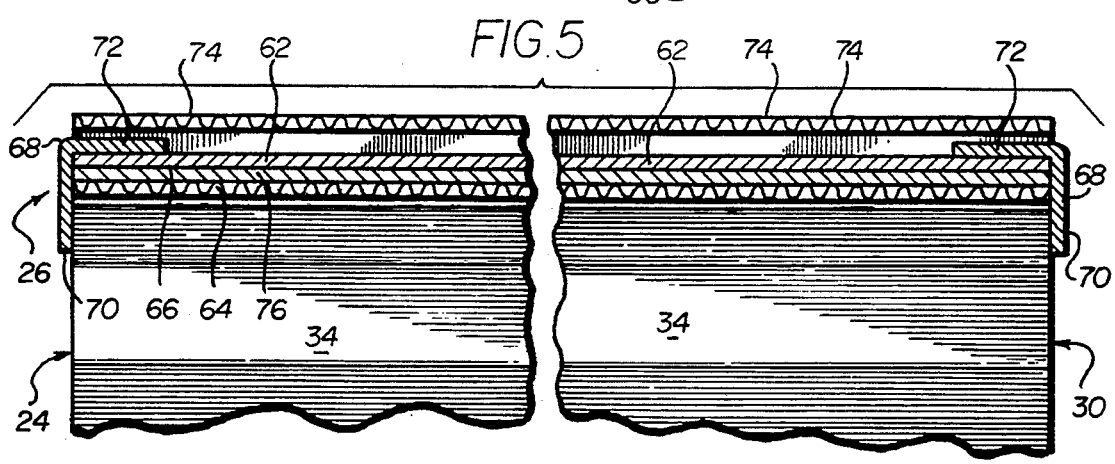
FIG. 5 is a cross-sectional view of an interlocking structure of the bulkhead void filler, partially cut away.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The bulkhead void filler 20 of the present invention is used in a cargo bay for filling empty spaces or areas in the cargo bay during the shipment of cargo to prevent the cargo from shifting during transport. The bulkhead void filler 20 may be used in a variety of shipping transports, for example, a truck, ship or airplane cargo bay.

The bulkhead void filler 20 of the present invention is of a light-weight construction and is generally comprised of a first rigid panel 22 and a second rigid panel 24 that are non-pivotably, but disengagably, attached to each other by a novel interlocking structure 26, which will be described in detail herein, at the upper ends 28, 30 of the panels, respectively. The void filler 20 may have a variety of sizes, depending on the use. The first 22 and second 24 rigid panels are of substantially equal size and similar construction. When the rigid panels 22, 24 are not attached, as illustrated in FIG. 2, the panels 22, 24 lie in a generally flat, side-by-side disposition which allows for easy storage and shipment. When the rigid panels 22, 24 are attached by the interlocking structure 26 as shown in FIGS. 1 and 3, the bulkhead void filler 20 generally has an inverted V configuration. The bulkhead void filler 20 of the present invention represents a further advance over a void filler disclosed in Applicant's co-pending application Ser. No. 08/074,587 filed Jun. 11, 1993 entitled "Bulkhead Void Filler".

In use, the bulkhead void filler 20 is placed between the cargo and the walls of the cargo area or bulkhead, or between separate pieces of cargo. The vertical edges 32 of the void filler 20 abut the cargo and/or wall and resist the forces created by the load of the cargo during transport. Multiple bulkhead void fillers may be placed in a side-by-side disposition to fill the empty areas in the cargo bay if necessary.

Each separate rigid panel 22, 24 is of a sandwich-type construction so as to increase the strength of the bulkhead void filler 20 so the void filler 20 will not collapse under the pressure of the cargo during shipping. The sandwich-type construction is formed by a first, or inner, face sheet 34 and a second, or outer, face sheet 36 attached to each other by a core 38.

The construction the rigid panels 22, 24 may be of a variety of forms. The rigid panels 22, 24 are substantially identical in construction except for the differences described herein. In the preferred embodiment, the core 38 is inserted between the face sheets 34, 36 and an end portion of the inner face sheet 34 overlaps and is and bonded to an end portion of the outer face sheet 36 over a predetermined distance so as to create overlapping portion 40, and an end portion of the outer face sheet 36 overlaps and is bonded to an end portion of the inner face sheet 34 over a predetermined distance so as to create overlapping portion 42. It is to be understood that other constructions for the rigid panels 22, 24 are within the scope of the invention so long as the core 38 is generally surrounded by the face sheets 34, 36 as illustrated in the drawings. The face sheets 34, 36 are bonded the core 38 by suitable means, such as adhesive, and are made from a materials having high strength and rigidity, such as corrugated cardboard.

Each core 38 is made of a suitable material, such as an angle member of paper, plastic, composite, or other material, and has a corrugated or zig-zag configuration in order to reinforce and strengthen the rigid panels 22, 24 so as to prevent the panels 22, 24 from collapsing. The core 38 may be of a variety of forms.

In the preferred embodiment of the core 38, as shown in the drawings, the core 38 includes multiple M-shaped braces 44 which form individual panels. Each brace 44 is made up of two V-shaped sheets 46, 48 preferably made of an angle member, laid side-by-side to create the M-shape. Each V-shaped sheet has panels or legs 50, 52. A connecting V-shaped sheet 54, preferably made of an angle member, overlaps a leg 50, 52 of each V-shaped sheet 46, 48, respectively, and attaches the two sheets 46, 48 together. The connecting sheet 54 is bonded to sheets 46, 48 by suitable means such as adhesive. The legs 50, 52 of the sheets 46, 48 are angled at approximately 45° to the face sheets 34, 36 with a 90° angle between the legs 50, 52. At the portion where the connecting V-shaped sheet 54 overlaps a leg 50, 52 of the sheets 46, 48, respectively, a double thickness is created which achieves additional strength with less weight while reducing the cost of manufacture since each piece is not a double thickness. The M-shaped braces 44 may be spaced depending on the strength needed in the particular application. The space can vary from one half of an inch up to twenty inches. This flexibility allows the M-shaped brace 44 to be used in a variety of applications. The M-shaped braces 44 are attached to the face sheets 34, 36 at substantially all of the fold lines or ridges 56 by suitable means such as a bonding adhesive.

Alternatively, the core 38 may be made of at least one folded sheet (not shown) having a series of individual panels of approximately equal length. Multiple folded sheets may be used.

The novel interlocking structure 26 of the present invention allows the rigid panels 22, 24 to be attached in a non-pivotable configuration, as shown in FIGS. 1 and 3, while also allowing the rigid panels 22, 24 to be detached from each other so that the panels 22, 24 can lie in a side-by-side disposition, as shown in FIG. 2, for easier storage. The non-pivotable configuration provided by the interlocking structure 26 will not allow the bulkhead void filler 20 to collapse or pivot to a closed, side-by-side position under pressure. This overcomes a disadvantage presented by prior art pivotable bulk head void fillers.

To form the interlocking structure 26, a side clip or bracket 58, is attached to the upper end 30 of the second rigid panel 24 and generally overlaps the overlapping portion 40. The side clip 58 is generally shaped as an L and is made of a suitable rigid material, such as an angle member of paper, plastic, composite, or other suitable material. The L-shaped side clip 58 includes two legs, vertical leg 60 and horizontal leg 62. The vertical leg 60 extends downwardly a predetermined distance along the overlapping portion 40 and its lower portion is bonded to the overlapping portion 40 by appropriate means, such as adhesive. The horizontal leg 62 is offset a predetermined distance from the upper end 30 or top 64 of the second panel 24, which is generally equal to the width or thickness of a leg 52 of the core 38 for reasons which will be described hereinafter, and extends along substantially the entire length of the top 64 of the panel 24. Thus, a space or a gap 66 that is generally equal to the width or thickness of a leg 52 of the core 38 is created between the horizontal leg 62 of the side clip 58 and the top 64 of the second rigid panel 24.

The interlocking structure 26 further includes end clips or brackets 68 which are attached to the vertical edges 32 of the second rigid panel 24 at the panel's upper ends 30. Each end clip 68 is generally shaped as an L and is made of a suitable rigid material, such as an angle member of paper, plastic, composite, or other suitable material. Each L-shaped end clip 68 includes two legs, vertical leg 70 and horizontal leg 72. The vertical leg 70 extends downwardly a predetermined distance along the upper end 30 of the second rigid panel 24 and its lower portion is bonded to the panel 24 by appropriate means, such as adhesive. The horizontal leg 72 is offset a predetermined distance from the top 64 of the panel 24 and overlaps the horizontal leg 62 of the side clip 58. The horizontal leg 72 of each end clip 68 is bonded to the horizontal leg 62 of the side clip 58 by appropriate means, such as adhesive. Thus, the gap 66 is enclosed from three sides.

In order to connect the two panels 22, 24 together, the inner face sheet 34 of the first panel 22 is cut along a horizontal line at a predetermined distance from the top of the first panel 22 in order to form a flap or panel section 74. The flap 74 is not attached to the core 38 and is free moving since the upper portion of the inner face sheet 34 is not bonded to the corrugated core 38. The flap 74 is of a sufficient length to overlap the upper end 30 of the second rigid panel 24.

When the first panel 22 is cut to create the flap 74, a portion of the upper end of the corrugated core 38 is exposed. To attach the rigid panels 22, 24 together, the uppermost exposed individual leg 76 of the core 38 of the first rigid panel 22 is slid into the gap 66 of the interlocking structure 26 and the upper end 30 of the second rigid panel 24 is placed in an abutting relationship with the second uppermost exposed individual leg 78 of the core 38 of the first rigid panel 22. Since the width or thickness of the gap 66 is approximately the same size as the leg 76, the uppermost leg 76 of the core 38 is held snugly and captured within the gap 66 and the end clips 68 prevent the core leg 76 from sliding out the sides of the interlocking structure 26. When the rigid panels 22, 24 are interlocked by the interlocking structure 26, the rigid panels 22, 24 are at approximately a 45° angle with respect to each other and cannot pivot in relation to each other.

The flap 74 may be folded over the upper end 30 of the second panel 24 and attached to the overlapping portion 40 by using known releasable fasteners such as Velcro ® patches 80 on the flap 74 with complementary Velcro ® patches 82 on the overlapping portion 40. Alternatively, the flap 74 may hang freely. Additionally, the upper end 30 of the second panel 24 may be attached to the second uppermost individual leg 78 of the core 38 of the first panel 22 by releasable fasteners such as complementary Velcro ® patches 84, 86. These patches help to hold the panels 22, 24 in a secure and non-pivotable configuration and to prevent the panels 22, 24 from vibrating and disengaging during use. Patches or a strip of Velcro ® may be used. Velcro ® is advantageous to use since it can be attached and detached multiple times while holding the panels 22, 24 securely together. It is to be understood that other forms of attachment may be used without departing from the scope of the invention.

The bulkhead void filler 20 of the present invention also includes a connector 88 that also serves the function of a spread-limiter. The spread-limiter 88 is a sheet attached to an inside portion of each rigid panel 22, 24 at a small distance above the bottom end 90, 92 of each rigid panel 22, 24, respectively. The spread-limiter 88 is attached to the rigid panels 22, 24 by suitable means, such as adhesive, and is made of a suitable material having high strength, such as Kraft paper.

The spread-limiter 88 serves two functions. First, when the rigid panels 22, 24 are in the disassembled condition, as shown in FIG. 2, the spread-limiter 88 keeps the panels 22, 24 in matched pairs. In this condition, the spread-limiter 88 is collapsed and the rigid panels 22, 24 may be placed in a generally flat, side-by-side disposition, as shown in FIG. 2. This disposition allows for easier shipment and storage of the bulkhead void filler 20 since it can be folded up in a compact manner.

Second, when the rigid panels 22, 24 are in the assembled condition, as shown in FIGS. 1 and 3, the spread-limiter 88 defines the maximum distance the bottom ends 90, 92 of the rigid panels 22, 24 may be apart and prevents the rigid panels 22, 24 from spreading any greater distance. When assembled, the bottom ends 90, 92 of the rigid panels 22, 24 are spread apart approximately the length of the spread-limiter 88. Preferably, the rigid panels 22, 24 are only allowed to spread 45" to 46" when used with a 92" or 96" inch wide trailer cargo area and in the preferred embodiment, the spread-limiter 88 allows the panels 22, 24 to spread apart a distance of 46" when used with a 92" or 96" inch wide trailer cargo area.

In order to prevent the bulkhead void filler 20 from collapsing inwardly, the void filler 20 includes a compression bar 96. The compression bar 96 is attached to the second rigid panel 24 by a hinge 98 at a small distance above the spread-limiter 88. The compression bar 96 may be made of a suitable material, such as "U" channel board and is approximately the same length as the spread-limiter 88. The hinge 98 is made of a suitable material, such as Kraft paper and is generally bonded to the inner face sheet 34 of the second rigid panel 24 by suitable means, such as adhesive.

When the bulkhead void filler 20 is in an assembled configuration, the compression bar 96 is pivoted from its stored, vertical position to a horizontal position in which the compression bar 96 generally lies on top of the spread-limiter 88. The ends of the compression bar 96 generally abut the inner face sheets 34 of each of the panels 22, 24. The compression bar 96 may include a patch of Velcro ® 100 on it with a complementary patch of Velcro ® 102 on the inner face sheet 34 of the second rigid panel 24 in order to securely hold the bar 96 in a vertical position when the bulkhead void filler 20 is disassembled.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A bulkhead void filler for use in a cargo area, comprising:

first and second rigid panels, each having an upper end and a lower end;

said first and second panels each having first and second face sheets and a reinforcing and strengthening core interposed therebetween;

first fastening means operatively connected to said lower ends of said first and second rigid panels for permitting said first and second rigid panels to be selectively disposed in either a first erected operative mode or a second collapsed inoperative mode with respect to each other; and second fastening means operatively associated with said upper ends of said first and second rigid panels for non-pivotably connecting said first and second rigid panels together when said first and second rigid panels are selectively disposed in said first erected operative mode, and for permitting said first and second rigid panels to be selectively disposed in said second collapsed inoperative mode when said second fastening means is not connected between said first and second rigid panels, said second fastening means comprising first interlocking means mounted externally upon said first rigid panel for defining a gap between said first interlocking means and an external surface portion of said upper end of said first rigid panel, and second interlocking means comprising a portion of said core located within said upper end of said second rigid panel and disposed within said gap defined upon said first rigid panel when said first and second rigid panels are selectively disposed in said first erected operative mode for matingly engaging said first interlocking means of said first rigid panel.

2. A bulkhead void filler as defined in claim 1, wherein each of said cores is corrugated, and wherein further, each of said cores is defined by individual legs.

3. A bulkhead void filler as defined in claim 2, wherein each of said cores is comprised of a plurality of M-shaped braces.

4. A bulkhead void filler as defined in claim 2, wherein said second interlocking means comprises an individual leg of said corrugated core inserted into said gap.

5. A bulkhead void filler as defined in claim 4, wherein an upper portion of said first panel abuts and fits snugly against an upper portion of said corrugated core of said second panel.

6. A bulkhead void filler as defined in claim 5, wherein said upper portion of said first panel is attached to said upper portion of said corrugated core of said second panel by a releasable fastener.

7. The void filler as set forth in claim 6, wherein:
said releasable fastener comprises VELCRO.

8. A bulkhead void filler as defined in claim 1, wherein said second panel includes a flap formed from a portion of the upper end of the second panel that overlaps the upper end of the first panel.

9. A bulkhead void filler as defined in claim 8, wherein said flap is attached to said first panel by a releasable fastener.

10. The void filler as set forth in claim 9, wherein: said releasable fastener comprises VELCRO.

11. A bulkhead void filler as defined in claim 1, wherein said first interlocking means includes at least one clip attached to an upper portion of said first panel, said at least one clip defining said gap between said at least one clip and said upper end of said first panel.

12. A bulkhead void filler as defined in claim 11, wherein said first interlocking means includes a side clip and two end clips.

13. A bulkhead void filler as defined in claim 12, wherein said end clips overlap said side clip.

14. A bulkhead void filler as defined in claim 11, wherein said at least one clip is generally L-shaped.

15. A bulkhead void filler as defined in claim 1, wherein said first fastening means comprises a spread limiting means attached at a bottom portion of each panel for limiting the distance the panels can be spread apart.

16. A bulkhead void filler as defined in claim 15, further including a compression bar attached at a bottom portion of one of said panels for preventing said panels from moving inward toward said collapsed position.

17. The void filler as set forth in claim 16, wherein: said compression bar is disposed atop said spread limiting means when said first and second rigid panels are disposed in said first erected operative mode.

18. The void filler as set forth in claim 16, wherein: said compression bar is pivotably attached to a bottom portion of said first rigid panel so as to be movable between a first position disposed substantially parallel to said first and second rigid panels when said first and second rigid panels are disposed in said second collapsed inoperative mode, and a second position disposed substantially transverse to said first and second rigid panels when said first and second rigid panels are disposed in said first erected operative mode.

19. A bulkhead void filler as defined in claim 18, wherein said compression bar is attached to said first panel by a hinge.

20. A bulkhead void filler as defined in claim 18, wherein said compression bar is disengagably attached to said first panel by a releasable fastener so as to permit said movement between said first and second positions.

21. The void filler as set forth in claim 20, wherein: said releasable fastener comprises VELCRO.

22. The void filler as set forth in claim 1, wherein: said first and second rigid panels together define a substantially inverted V-shaped configuration when said first and second rigid panels are disposed in said first erected operative mode; and
said first and second rigid panels are disposed in side-by-side positions when said first and second rigid panels are disposed in said second collapsed inoperative mode.

* * * * *